(12) United States Patent
Subbian et al.

(10) Patent No.: US 7,162,343 B2
(45) Date of Patent: Jan. 9, 2007

(54) INTELLIGENT VEHICLE ROLLOVER DETECTION METHODS AND SYSTEMS

(75) Inventors: Thiag Subbian, Farmington Hills, MI (US); David Bauch, South Lyon, MI (US); Fubang Wu, Rochester Hills, MI (US); Mukesh Amin, Canton, MI (US); Clifford C. Chou, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 10/943,729

(22) Filed: Sep. 17, 2004

(65) Prior Publication Data

US 2006/0064218 A1    Mar. 23, 2006

(51) Int. Cl.
*B60R 21/132* (2006.01)
*B60R 21/13* (2006.01)
*G06F 17/00* (2006.01)

(52) U.S. Cl. .......................... 701/45; 340/440
(58) Field of Classification Search ............... None
See application file for complete search history.

(56) References Cited

U.S. PATENT DOCUMENTS

| | | | |
|---|---|---|---|
| 5,899,949 A | 5/1999 | Kincaid | |
| 6,055,472 A | 4/2000 | Breunig et al. | |
| 6,141,604 A | 10/2000 | Mattes et al. | |
| 6,158,768 A | 12/2000 | Steffens, Jr. et al. | |
| 6,182,783 B1 * | 2/2001 | Bayley | 180/282 |
| 6,282,474 B1 | 8/2001 | Chou et al. | |
| 6,301,536 B1 | 10/2001 | Vaessen et al. | |
| 6,311,111 B1 | 10/2001 | Leimbach et al. | |
| 6,312,013 B1 | 11/2001 | Baur et al. | |
| 6,433,681 B1 * | 8/2002 | Foo et al. | 340/440 |
| 6,526,334 B1 | 2/2003 | Latarnik et al. | |
| 6,542,073 B1 | 4/2003 | Yeh et al. | |
| 6,594,570 B1 | 7/2003 | Nagao et al. | |
| 6,600,414 B1 * | 7/2003 | Foo et al. | 340/440 |
| 6,678,633 B1 | 1/2004 | Hessmert et al. | |
| 6,684,140 B1 | 1/2004 | Lu | |
| 6,694,225 B1 | 2/2004 | Aga et al. | |
| 6,714,848 B1 | 3/2004 | Schubert et al. | |
| 2003/0225499 A1 | 12/2003 | Holler | |
| 2004/0007860 A1 | 1/2004 | Miyata et al. | |
| 2004/0128060 A1 | 7/2004 | Park | |

(Continued)

FOREIGN PATENT DOCUMENTS

DE        10235567 A1    2/2004

(Continued)

OTHER PUBLICATIONS

UK Patenet Search Application No.: GB0517249.9, dated Dec. 9, 2005.

(Continued)

*Primary Examiner*—Michael J. Zanelli
(74) *Attorney, Agent, or Firm*—Fredrick V. Owens, Esq.; Troutman Sanders LLP; James Hunt Yancey, Jr.

(57) ABSTRACT

Intelligent vehicle rollover detection systems and methods are claimed and described. An embodiment may comprise various data sensors to sense various signals and a control circuit to receive the signals. In some embodiments, the control circuit may be adapted to provide a vehicle unstable signal to activate a first occupant restraint system and a rollover detection signal to activate a second occupant restraint system. In some embodiments, the control circuit may also determine an updated threshold and a reduced threshold, and generate a rollover detection signal in response to at least one of the updated threshold and a reduced threshold. Other embodiments are also claimed and described.

35 Claims, 4 Drawing Sheets

U.S. PATENT DOCUMENTS

2006/0058934 A1   3/2006   Le et al.

FOREIGN PATENT DOCUMENTS

| | | |
|---|---|---|
| EP | 1 227 010 A2 | 7/2002 |
| EP | 1 566 315 A1 | 8/2005 |
| GB | 2 335 521 A | 9/1999 |
| JP | 11170976 A | 6/1999 |
| WO | WO 96/06418 A1 | 2/1996 |
| WO | WO03/081180 A2 | 2/2003 |

OTHER PUBLICATIONS

UK Patent Office Search Report.

* cited by examiner

INTELLIGENT VEHICLE ROLLOVER DETECTION METHODS AND SYSTEMS

TECHNICAL FIELD

The various embodiments of the present invention relate generally to automobile systems, and more particularly, to intelligent methods and systems for detecting automobile rollovers and deploying vehicle occupant restraint systems.

BACKGROUND

The proliferation of vehicle occupant restraint systems in recent years has saved many lives when unfortunate vehicle accidents occur. Various vehicle occupant restraint systems are utilized and typical inflatable restraint systems include driver and passenger front airbags, side airbags and side curtain airbags. Non-inflatable restraint systems also exist, and a pretensioner seatbelt system that tightens seatbelts is a sample non-inflatable restraint system. These various occupant restraint systems are all critical in protecting vehicle occupants during accidents, but are only as good as the deployment control systems tasked with detecting and deploying occupant restraint systems.

Typically, deployment control systems utilize certain signals from sensors placed throughout an automobile to determine if certain predetermined thresholds are satisfied when deploying an occupant restraint system. Automobile engineers, scientists, and other researchers usually obtain these predetermined thresholds by analyzing test data obtained from simulated crash and rollover events. Once obtained, the predetermined thresholds are programmed into deployment control systems. And, the programmed detection and deployment control systems determine whether or not to initiate occupant restraint systems based on incoming sensor data. Although current detection and deployment systems protect many vehicle occupants, such systems do not periodically update the deployment thresholds with real-time data nor do these systems utilize multi-staged rollover sensing systems. Additionally, current detection and deployment systems may inadvertently initiate occupant restraint systems which may harm vehicle occupants, alarm vehicle occupants resulting in an automobile accident, and may cost vehicle owners large sums of money to repackage occupant restraint systems. Current deployment systems may also inadvertently deploy rollover restraint systems instead of crash restraint systems during a rollover or deploy crash restraint systems during a rollover event.

What is needed, therefore, is a rollover detection and deployment control system capable of updating rollover event thresholds with real-time data enabling occupant restraint systems to deploy based on changing vehicle characteristics. What is also needed is a deployment control system to distinguish between crash, rollover, and safe events to prevent the misfiring of crash and rollover occupant restraint systems. An intelligent multi-stage rollover sensing system would prevent costly deployment system misfires and increase rollover event detection accuracy.

SUMMARY

The present invention provides an improved rollover detection system that may be used to determine when to deploy various vehicle occupant restraints. Some embodiments of the rollover detection system may include a longitudinal acceleration sensor, a side acceleration sensor, a vertical acceleration sensor, a lateral acceleration sensor, a roll rate sensor, an initial roll angle detector, a yaw-rate sensor, a side-slip angle detector, a vehicle speed sensor, a vehicle mass sensor, a tire pressure sensor, and moment of inertia detectors. Some embodiments of the rollover detection system may be adapted to determine an initial rollover threshold in response to nominal data values and determine an updated threshold in response to vehicle status changes. Still yet other embodiments of the rollover detection system may also be adapted to select one or more rollover threshold between multiple thresholds when determining to deploy various occupant restraint systems. And, some embodiments of the rollover detection systems and methods may be further adapted to operate in different operating modes and deploy various occupant restraint systems in the different operating modes.

Some embodiments of an automobile rollover detection system may comprise a control circuit to receive an initial roll angle signal, an acceleration signal, a roll rate signal, a yaw-rate signal, a tire-pressure signal, a driver intention signal, a vehicle side slip angle signal, a vehicle speed signal, and a steering angle signal. The control circuit may be adapted to generate a vehicle unstable signal in response to the initial roll angle signal, the acceleration signal, the roll-rate signal, the yaw-rate signal, the tire-pressure signal, or the driver intention signal. The control circuit may also be adapted to determine a first and second threshold, and generate a rollover detection signal in response to at least one of the first threshold and the second threshold.

DETAILED DESCRIPTION

The various embodiments of the present invention provide methods and systems for detecting automobile rollover events and deploying occupant restraint systems. Some embodiments of the present invention may be used in automobiles of various types to determine if a rollover or crash event is occurring. Still some embodiments may be used to deploy one or more occupant restraint systems upon detecting (or sensing) a rollover event to protect vehicle occupants. Still yet some embodiments of the present invention may be used to distinguish between rollover and non-rollover events by operating in different operating modes and deploying various occupant restraint systems in the different operating modes discussed below.

Figure 1:
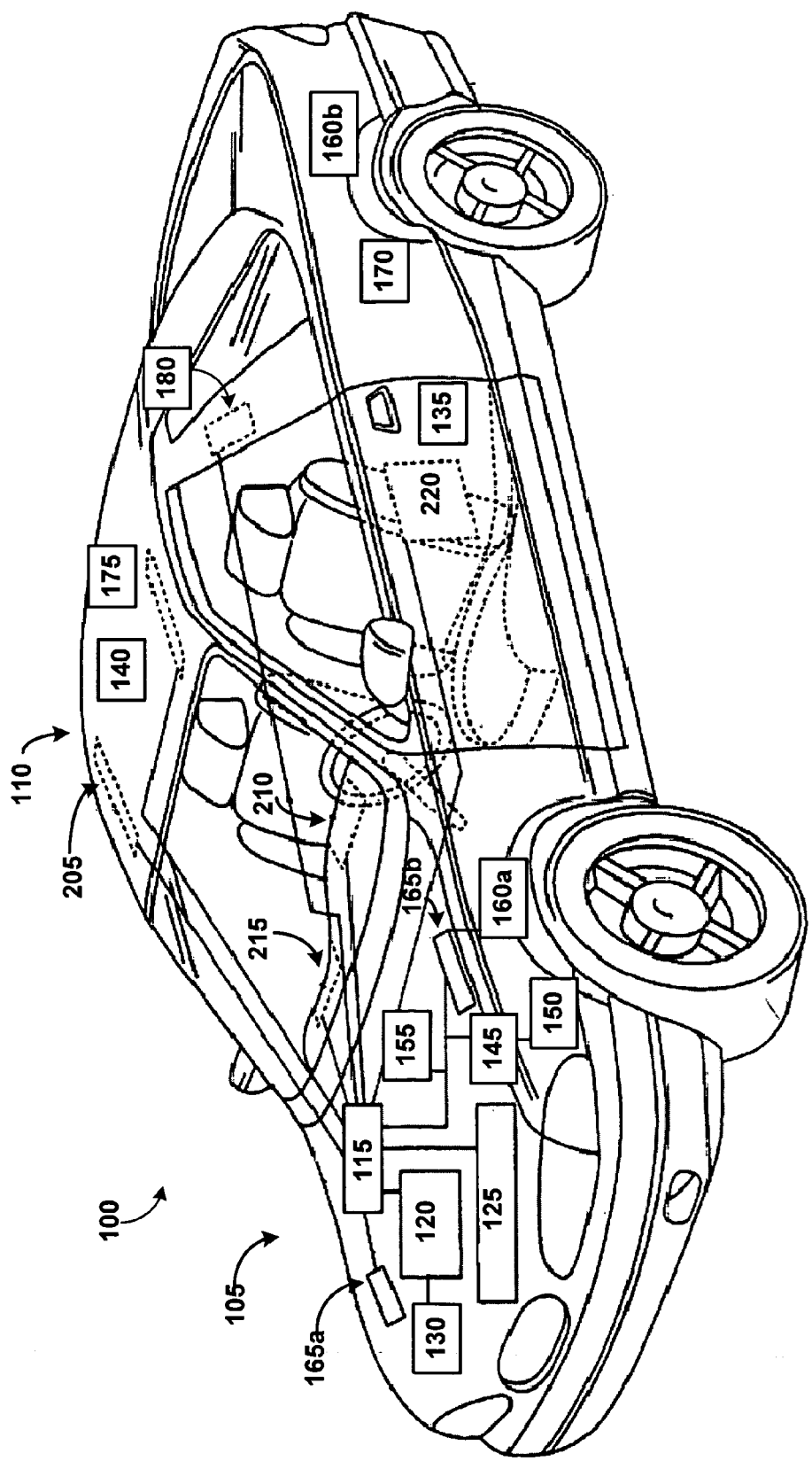
FIG. 1 depicts an automobile utilizing an embodiment of the present invention.

Now referring to the figures, FIG. 1 is a perspective view of an automobile utilizing an embodiment of a rollover detection system. As illustrated, a vehicle 100 has a rollover sensing system 105 coupled to an occupant restraint system 110. Although vehicle 100 is depicted as a car, vehicle 100 may be any type of vehicle including a truck, a van, a sport utility vehicle, or other automotive vehicle. Rollover sensing system 105 may generally comprise a control circuit 115 (control circuit may also mean control module or controller), a roll rate sensor 120, a roll angle detector 125, a longitudinal accelerometer 130, a side acceleration accelerometer 135, a vertical accelerometer 140, a yaw rate sensor 145, side slip angle sensor 150, a vehicle speed sensor 155, a vehicle weight sensor 160, a lateral accelerometer 165, a ride height sensor 170, a tire pressure sensor 170, and an inertia sensor 175. Other sensors may also be utilized in some embodiments of the invention including a window status sensor 180, a seatbelt buckle status sensor (not shown), steering wheel sensor (not shown), and wheel status sensors (not shown). Those ordinarily skilled in the art will understand that the placement of the sensors in FIG. 1 is for informational purposes and that the actual placement of such sensors will vary according to implementation. Some of the sensors may be used to generate signal inputs for ancillary algorithms or to calculate data based on the sensor signals that may be used in some embodiments of the invention. For example, roll angle and side slip angle data may be sensed or may be a calculation based on one or more other sensor signals. Similarly, various moment of inertia signals and acceleration signals may be calculated using other signals to determine these values. Those ordinarily skilled in the art will understand that some vehicle data signals may also be calculated and sensed to determine x-axis, y-axis, and z-axis values.

Also, the sensors used in accordance with the various embodiments of the invention may comprise sub-parts such that the sensors may sense data from various parts of vehicle 100. For example, lateral accelerometer 165 may comprise two sensors 165*a* and 165*b* and vehicle weight sensor 160 may comprise multiple sensors 160*a*, 160*b*, 160*c* (not shown), 160*d* (not shown) to record vehicle weight data in different areas of vehicle 100. The sensors used in accordance with the various embodiments of the invention may be electrically or wirelessly coupled to control circuit 115, any other sensor, or other vehicle data system.

Control circuit 115 may have various features in controlling the rollover sensing system 105. Control circuit 115 may have any number of inputs and outputs depending on the implementation of rollover sensing system 105. Control circuit 115 may be microprocessor based, or may be implemented with software, hardware, or a combination of both. Additionally, control circuit 115 may be capable of receiving and transmitting wireless signals to and from the sensors or to and from other wireless devices such as an emergency call system or automotive repair system. Control circuit 115 may be shared with occupant restraint system 110, or occupant restraint system 110 may have its own controller. Control circuit 115 may be adapted to determine an initial rollover threshold in response to nominal vehicle values including center of gravity height, track width, vehicle mass (including any payload), vehicle moment of inertia, sprung mass moment of inertia, and suspension characteristics. In some embodiments, various data sensors may sense these nominal vehicle values. Control circuit 115 may also be adapted to update the initial threshold to reflect any changes in a vehicle's propensity to rollover and any thresholds used for rollover detection. Control circuit 115 may be further adapted to reduce the updated threshold. And in some embodiments, control circuit 115 may be adapted to select between an updated threshold and a reduced threshold in detecting the occurrence of a rollover event.

The rollover thresholds may be dynamic thresholds, static thresholds, or both. A first threshold may be an energy based threshold and a rollover may detected with this threshold by monitoring a vehicle mass signal, moment of inertia signals, and a center of gravity height signal. A second threshold may also be used and it may be a reduced threshold that is lower than the updated threshold. The reduction amount may depend on the particular vehicle or the implementation of a rollover detection system in a vehicle. The degree of reduction may also depend on a vehicle initial angle signal, a speed signal, a vehicle acceleration signal, a tire pressure signal, a steering wheel signal. The reduced threshold may be a function of a roll angle signal, a roll rate signal, and a lateral acceleration signal. As mentioned above, some embodiments of the invention may be able to select between several thresholds in determining when a rollover event is detected. Such a selection may be made responsive to one or more data signals including the window status signal and the seatbelt status signal. This feature of some embodiments of the present invention enables a rollover detection system to determine the position of a vehicle occupant within the vehicle and deploy an occupant restraint system knowing where a vehicle occupant is located within a vehicle.

Control circuit 115 may also control and initiate an occupant restraint system 110 in accordance with the various embodiments of the invention. Rollover detection system 105 and occupant restraint system 110 may comprise various restraint devices. Such devices may include an inflatable curtain airbag 205, a driver side front airbag 210, a passenger side front airbag 215, a side airbag 220, a belt retractor (not shown), or a pyro-buckle pretensioner (not shown). One or more these restraint devices may be used in the various embodiments of the present invention and control circuit 115 may be adapted to activate these restraint devices at the same time or at different time intervals. Control circuit 115 may also be used to control the actuation of each of the occupant restraint devices. Various other sensors and separate controllers may also be used in some embodiments to control the occupant restraint devices. Control circuit 115 may deploy the restraint devices by generating one or more control signals in response to multiple rollover detection thresholds.

Some embodiments of the invention may be adapted to operate in a multi-mode or dual mode operational scheme in determining what order to deploy one or more occupant restraint systems. For example, control circuit 115 may be configured to operate in a dual mode operational setting to ensure that a rollover curtain, side curtain, or other rollover occupant restraint systems deploy when a rollover event is occurring. In this regard, control circuit 115 may be adapted to monitor a plurality of data signals and provide a vehicle stability signal in response to the data signals in a first operational mode. A vehicle stability signal may indicate that a vehicle may have experienced or is experiencing an unstable event. In some embodiments, the vehicle stability signal may be responsive to a driver intention algorithm signal, vehicle side slipping angle signal, vehicle driving speed signal, initial angle sensor signal, a yaw/pitch rate signal, vehicle acceleration signal, a steering angle/rate signal, a roll rate signal, and a tire pressure signal. In response to the vehicle stability signal, a first occupant restraint system, such as a seatbelt retractor, may be deployed in an effort to keep a vehicle occupant in position and clear of any other occupant restraint systems. After a first occupant restraint system is deployed, the control module 115 may be adapted to continually monitor to determine the status of a vehicle stability event. If such an event passes, the control module 115 may be adapted to dismiss the event and retract or cancel the first occupant restraint system. If a vehicle stability event does not pass, the control module may be adapted to monitor a plurality of data signals to detect a rollover event and deploy an occupant restraint system in a second mode.

Figure 2:
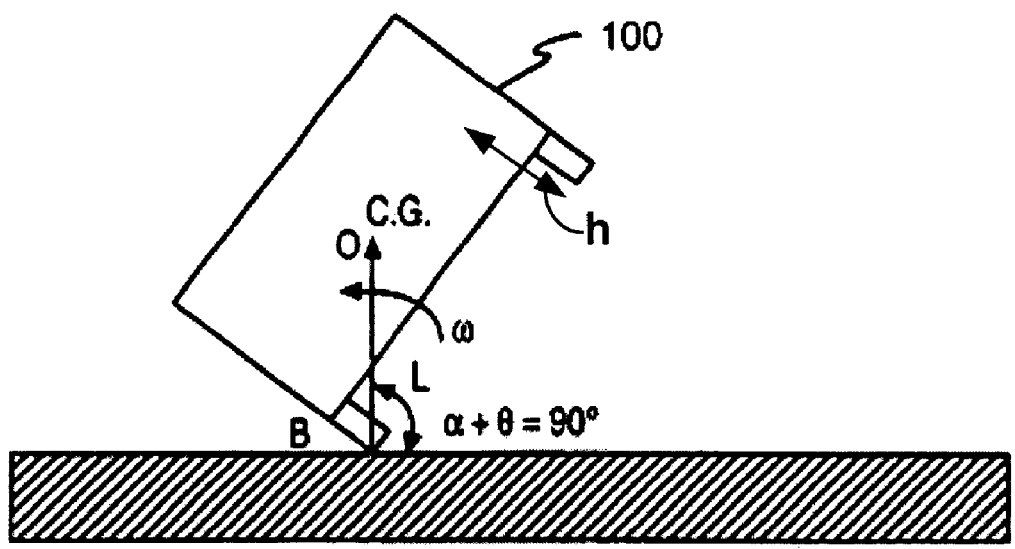
FIG. 2 depicts a simplified vehicle rollover model at a rollover condition.
Figure 3:
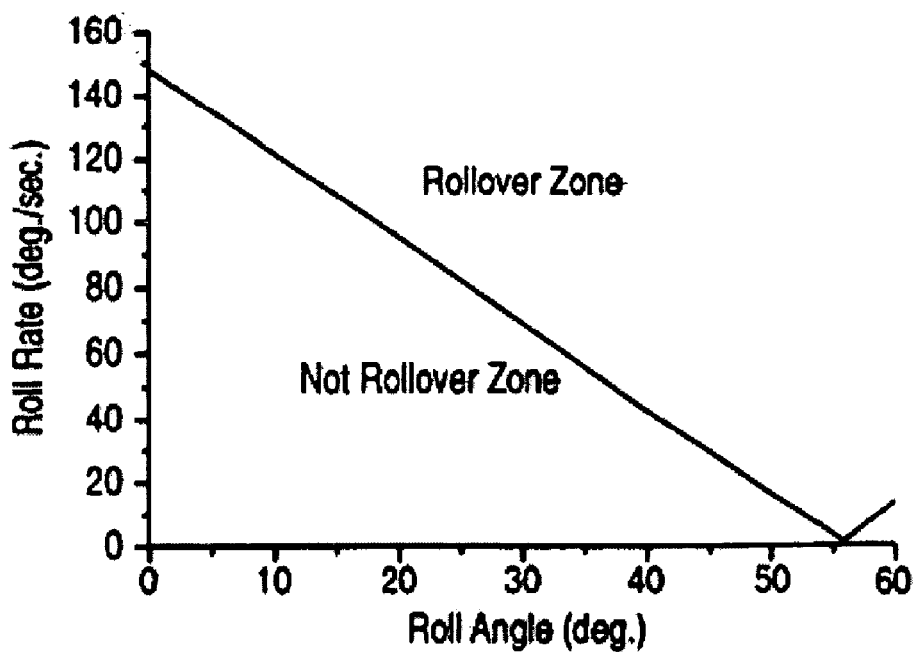
FIG. 3 depicts a two-dimensional plot of roll rate versus roll angle showing a kinetic energy based rollover threshold.

One threshold used to detect a rollover event may be an energy based threshold. Referring now to FIGS. 2 and 3, a kinetic energy-based criterion for a rigid body based on vehicle kinematics is illustrated with respect to vehicle 100. This threshold is based on the amount of potential energy needed to overcome the kinetic energy of a vehicle to roll a vehicle. The potential energy required to cause the vehicle to roll depends on the change in height ($\Delta H$) of the center of gravity (O), from a normal resting position (not shown). This potential energy may be expressed as:

$$E1 = \Delta H mg = (L-h)mg$$

where m is vehicle mass, g is the gravitational constant, L is the distance between the center of gravity and rolling point B, and h is the distance between the center of gravity (O) and the road surface under normal operating conditions. Also, the total energy a vehicle possesses consists of the potential energy and the kinetic energy, wherein the kinetic energy may be expressed as:

$$E2 = (L \times \sin(\alpha+\theta) - h)mg + ((I_o \omega^2)/2)$$

where $\theta$ is the angular displacement, $I_o$ is the moment of inertia of the vehicle with respect to the point the center of gravity (O), and $\omega$ is the vehicle rotational velocity or roll rate. If the kinetic energy (E2) is greater than the potential energy (E1), then a vehicle rollover event will occur. In determining the conditions under which a vehicle rollover may occur using a kinetic energy based threshold, an index (or measurement), $I_{Index}$ can be defined as:

$$I_{Index} = E1 - E2$$

which when substituted from above, becomes:

$$I_{Index} = L(1-\sin(\alpha+\theta))mg - ((I_o \omega 2)/2)$$

where $\alpha = a^* \tan(2h_{cg}/T)$ which is a stability index for determining the tripping point (or rollover point) of a vehicle. The plot illustrated in FIG. 3 depicts roll rate ($\omega$) versus roll angle ($\theta$) to illustrate that the rollover/non-rollover threshold is near linear. In other words, the kinetic energy threshold is a nearly linear threshold, and vehicle roll event or non-roll event is determined based upon the threshold in the roll rate versus roll angle as shown in FIG. 3. Such a threshold may be utilized by the embodiments of the present invention to detect when a rollover event is occurring. According to the above presented energy equation, the center of gravity height, track width, tire dimensions (tire width, static loaded radius), vehicle mass (including payload mass), vehicle moment of inertia, and initial roll angle of a vehicle are all factors that will determine an energy based vehicle rollover threshold. Some of the embodiments may determine an updated rollover threshold in response to changes in the above factors as changes in these factors may drastically affect the operation of rollover detection and occupant restraint systems. Also, some embodiments of the present invention may reduce the updated threshold in response to a window status signal or a seatbelt buckle status signal to quickly distinguish a rollover event from a non-roll event and deploy an occupant restraint system. A reduced threshold may be determined using an initial roll angle signal, a roll rate signal, and a lateral acceleration signal. One method of utilizing multiple rollover thresholds is illustrated in FIGS. 4A and 4B.

Figure 4A:
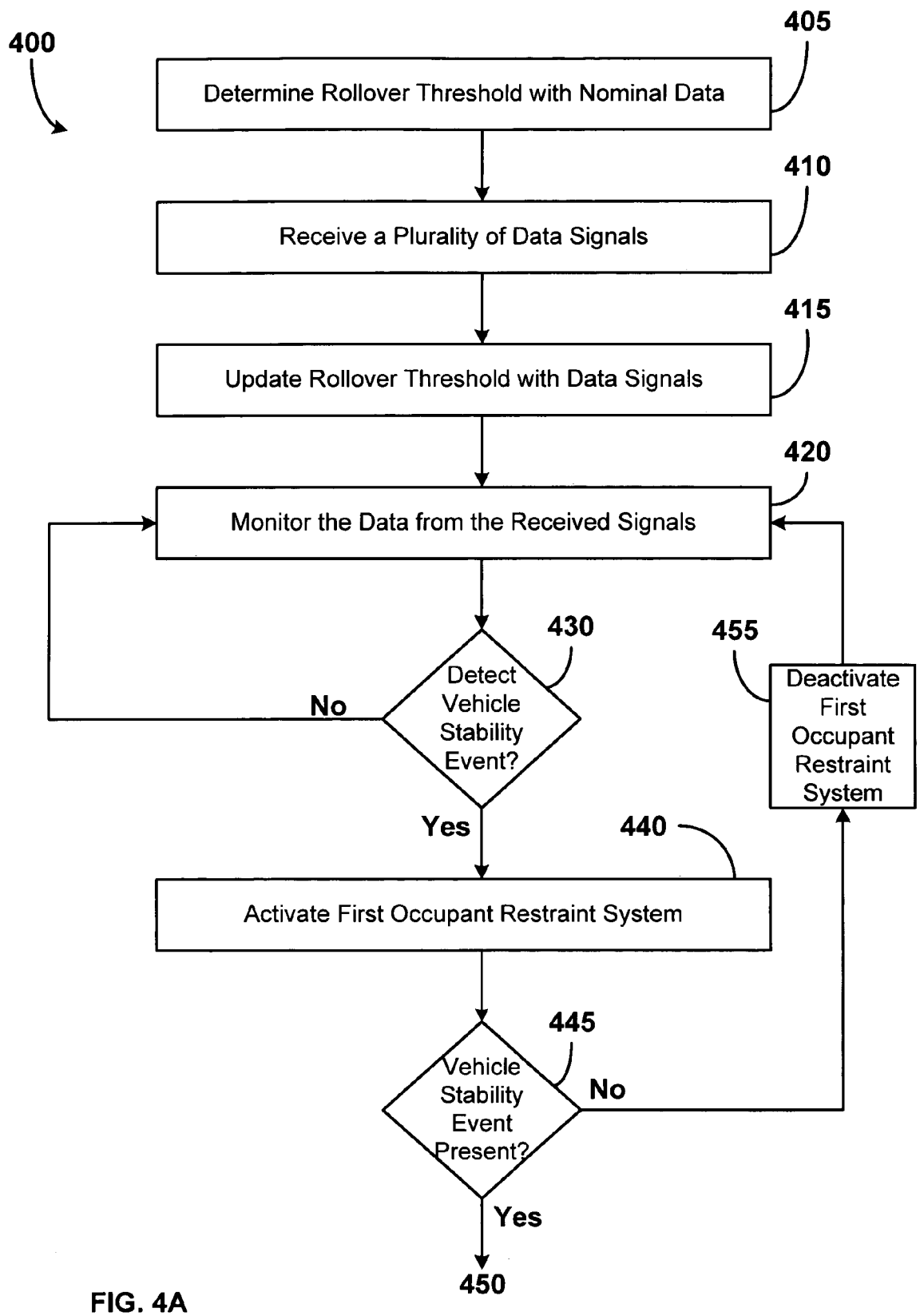
FIGS. 4A and 4B depict a logic flow diagram of a method embodiment of the present invention.
Figure 4B:
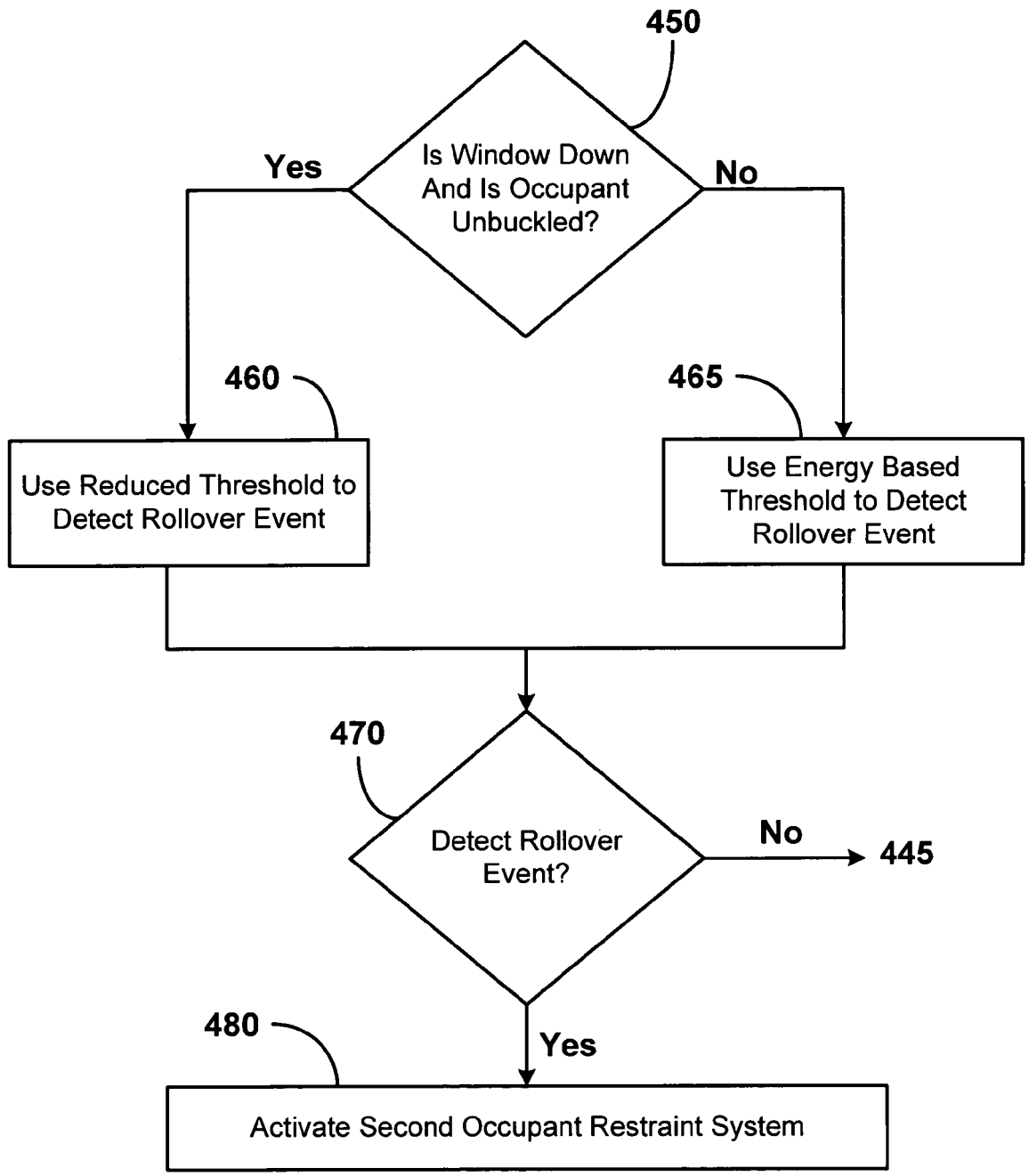

FIGS. 4A and 4B depict a logic flow diagram of a method embodiment 400 of the present invention. At 405, the method initiates by determining an initial rollover threshold with nominal vehicle data. After determining an initial threshold, a plurality of data signals from various sensors may be received at 410. These data signals may contain vehicle information and may indicate current vehicle operating status information. For example, some data signals may represent vehicle speed, vehicle mass (including payload), moment of inertia calculations, lateral acceleration, initial roll angle, and roll rate data. Upon receiving the various data signals, an updated rollover threshold may be determined or calculated at 415 reflecting an appropriate rollover threshold for a vehicle's current operating conditions. At 420 and 430, data from the data signals may be monitored and analyzed to determine if a vehicle stability event may occur. If such an event does not occur, then the data signals may continued to be monitored for such an event.

Upon the occurrence of a vehicle stability event, a first occupant restraint system may be activated at 440 during a first operational mode. A vehicle stability event may occur when: (a) a vehicle initial roll angle is greater than three degrees; (b) a vehicle's lateral acceleration is greater than 0.25 Gs; (c) a vehicle sliding event is detected; (d) a tire of a vehicle is lifted away from a driving surface; (e) a vehicle's speed is greater than 55 miles per hour and a vehicle's steering wheel input is greater than 300 degrees per second; (f) a vehicle is not traveling in a driver's intended direction; (g) a significant drop in tire pressure occurs such that the pressure drop is far from its nominal value; and other similar predetermined events. Upon detecting one or more of these events at 430 one or more first occupant restraint systems may be deployed at 440. In some embodiments a first occupant system may be a seatbelt retractor that tightens an occupant's seatbelt to keep a vehicle occupant in place and out of the way of other occupant restraint systems. In other embodiments, other occupant restraint systems may be deployed upon the detection of a vehicle stability event. The occupant restraint systems may be activated and deployed at the same time or at different times in other embodiments.

After deploying or activating one or more first occupant restraint systems some embodiments may continue to assess the presence of a vehicle stability event at 445. Should a vehicle stability event pass, the one or more first occupant restraint systems may be deactivated. In some embodiments, the first occupant restraint systems may be deactivated at the same time, at different times, or according to a certain predetermined order. Some embodiments of the present invention may be adapted to deactivate one or more first occupant restraint systems with a time delay to ensure that a vehicle stability event passes or to ensure that such systems are in place for another vehicle stability event that a vehicle may experience. If a vehicle stability event is present, some embodiments of the present invention may monitor another set of signals at 450 during a second operational mode. The signals monitored for vehicle stability events in a first operational mode may be the same as or different than the signals monitored during a second operational mode in other embodiments. For example, as shown in FIG. 4B, some embodiments may monitor a window signal status and a seatbelt status signal. A window signal status may indicate whether a vehicle window is up, down, or in an intermediate position. And, a seat belt status signal may indicate whether a seat belt is buckled or not buckled. Some embodiments of the present invention may have a plurality of window and seatbelt sensors to determine the status of a vehicle's window or seat belt buckles. After determining the status of one or more windows and seatbelt buckles in a vehicle, the embodiments of the present invention may select between multiple predetermined rollover thresholds to detect a rollover event.

An energy based threshold and a reduced threshold may be used in some embodiments of the present invention. Other embodiments may use more thresholds or may use thresholds calculated differently than these two. At 460, a reduced threshold is used to detect a rollover event and at 465, an energy based threshold is used to detect a rollover event. In some embodiments, the energy based threshold may be an updated threshold determined by sensing changes in a vehicle's rollover propensity while in others, the energy based threshold may be a threshold that does not reflect changes in a vehicle's rollover propensity. At 470, the embodiments of the present invention using one or more rollover thresholds may determine or detect if a rollover event is occurring. If a rollover event is not detected, some embodiments of the present invention may then proceed back to first mode of operation and determine if a vehicle stability event is present at 445. If a rollover event is detected, then a second occupant restraint system may be activated at 480. Such occupant restraint systems may include a seatbelt retractor, an airbag, a curtain airbag, a side-air bag, and a pyro-buckle pretensioner. Those ordinarily skilled in the art will also understand that method 400 may be performed in alternative orders in detecting automobile rollover events.

The various embodiments of the present invention provide a rollover detection system capable of distinguishing rollover events from non-rollover events and deploying rollover restraint systems during an actual rollover event. For example, some embodiments of the present invention may operate in a dual mode so that rollover restraint systems are only deployed in a second mode, and that occupant restraint systems are deployed in a first mode. The various embodiments of the present invention provide intelligent vehicle rollover detection methods and systems capable of monitoring data to update rollover thresholds as the rollover propensity for a vehicle may change with normal operating use.

The various embodiments of the present invention have been described with reference to the above discussed embodiments, but the present invention should not be construed to cover only these embodiments. Rather, these embodiments are only exemplary embodiments. Variations of the above exemplary embodiments may suggest themselves to those skilled in the art or others without departing from the spirit and scope of the present invention. The appended claims and their full range of equivalents should, therefore, only define the full scope of the present invention.

We claim:

1. An automobile rollover detection system comprising:
a control circuit to receive an initial roll angle signal, an acceleration signal, a roll rate signal, a yaw-rate signal, a tire-pressure signal, a driver intention signal, a side slip signal, a speed signal, and a steering angle signal;
wherein the control circuit is adapted to generate a vehicle unstable signal in response to at least one of the initial roll angle signal, the acceleration signal, the roll-rate signal, the yaw-rate signal, the tire-pressure signal, the driver intention signal; the side slip signal, the speed signal, and the steering angle signal; and
wherein the control circuit is further adapted to determine a first and second threshold, and generate a rollover detection signal in response to at least one of the first threshold and the second threshold.

2. The system of claim 1 wherein the control circuit is further adapted to select the first threshold or the second threshold to generate the rollover detection signal.

3. The system of claim 1 wherein the first threshold is an energy based threshold.

4. The system of claim 1 wherein the second threshold is responsive to at least one of the initial roll angle signal, the acceleration signal, and the roll rate signal.

5. The system of claim 1 wherein the second threshold is lower than the first threshold.

6. The system of claim 1 wherein the control circuit is further adapted to select the first or second threshold responsive to at least one of a window status signal and a seatbelt status signal.

7. The system of claim 1 wherein one of the first threshold and the second threshold is updated responsive to at least one signal selected from the group consisting of a vehicle weight signal, a ride height signal, the tire-pressure signal, a moment of inertia signal.

8. The system of claim 1, wherein the vehicle unstable signal is adapted to activate an occupant restraint system.

9. The system of claim 8, wherein the occupant restraint system is selected from the group consisting of a seatbelt retractor, an airbag, a curtain airbag, a side-air bag, and a pyro-buckle pretensioner.

10. The system of claim 1, wherein the rollover detection signal is adapted to activate an occupant restraint system.

11. The system of claim 10, wherein the occupant restraint system is selected from the group consisting of a seatbelt retractor, an airbag, a curtain airbag, a side-air bag, and a pyro-buckle pretensioner.

12. A method of detecting vehicle rollover comprising:
determining a threshold from a plurality of data signals;
receiving a window status signal and a seatbelt status signal; and
providing a rollover detection signal in response to the threshold, the window status signal, and the seatbelt status signal.

13. The method of claim 12 further comprising activating a first occupant restraint system in response to an unstable signal.

14. The method of claim 13 wherein the first occupant restraint system is a seatbelt retractor.

15. The method of claim 13 further comprising determining if the unstable event has ended.

16. The method of claim 15 further comprising deactivating the first occupant restraint system.

17. The method of claim 12 further comprising activating a second occupant restraint system in response to the rollover detection signal.

18. The method of claim 17 wherein the second occupant restraint system is selected from the group consisting of a seatbelt retractor, an airbag, a side curtain airbag, a side-air bag, and a pyro-buckle pretensioner.

19. The method of claim 12 further comprising modifying the threshold to provide a modified threshold.

20. The method of claim 19 wherein the modified threshold is a function of a roll rate signal, an initial roll angle signal, and a lateral acceleration signal.

21. The method of claim 19 further comprising selecting the threshold or the modified threshold in response to the window status signal and the seatbelt status signal.

22. The method of claim 19 wherein the threshold is reduced to provide the modified threshold.

23. The method of claim 12 wherein the threshold is energy based.

24. The method of claim 12 wherein at least one of the data signals is selected from the group consisting of a vehicle weight signal, a ride height signal, the tire-pressure signal, a moment of inertia signal.

25. A dual-mode automobile rollover detection system comprising:
- a plurality of automobile data sensors to generate a plurality of data signals;
- a control module to receive the data signals, to deploy a first occupant restraint in a first mode, and to deploy a second occupant restraint in a second mode, wherein the control module is adapted to select a first or second threshold in response to a window status signal and a seat belt status signal.

26. The system of claim 25 wherein the control module is adapted to update at least one of the first threshold and the second threshold responsive to the data signals.

27. The system of claim 25 wherein the control module is further adapted to enter the first mode upon the occurrence of a vehicle unstable event.

28. The system of claim 25 wherein the first threshold is energy based.

29. The system of claim 25 wherein the second threshold is lower than the first threshold.

30. The system of claim 25 wherein the second threshold is a function of a roll rate signal, an initial roll angle signal, and a lateral acceleration signal.

31. The system of claim 25 wherein the first occupant restraint system is a seat belt retractor.

32. The system of claim 25 wherein the second occupant restraint system is selected from the group consisting of an air bag, a side air bag, a curtain airbag, a seatbelt retractor, and a pyro-buckle pretensioner.

33. An automobile rollover detection system comprising:
- a control module to receive a window status signal and a seat belt status signal in determining a rollover threshold, wherein the control module is adapted to update the rollover threshold, and provide a reduced threshold in response to the window status signal and seat belt status signal.

34. The system of claim 33, the control module being adapted to operate in a first mode to activate a first occupant restraint, the first mode being associated with a vehicle stability event, and a second mode to activate a second occupant restraint in the second mode, the second mode being associated with a vehicle rollover event.

35. The system of claim 33, the control module being adapted to provide a signal to activate an occupant restraint system based on at least one of the rollover threshold and the reduced threshold.

* * * * *